(12) United States Patent  
Soga

(10) Patent No.: US 8,775,504 B2  
(45) Date of Patent: Jul. 8, 2014

(54) DOCUMENT MANAGEMENT SYSTEM, DOCUMENT MANAGEMENT METHOD AND RECORDING MEDIUM

(75) Inventor: Masaya Soga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 818 days.

(21) Appl. No.: 12/754,969

(22) Filed: Apr. 6, 2010

(65) Prior Publication Data

US 2010/0262652 A1  Oct. 14, 2010

(30) Foreign Application Priority Data

Apr. 14, 2009 (JP) ................ 2009-098102

(51) Int. Cl.  
*G06F 15/16* (2006.01)

(52) U.S. Cl.  
USPC ........... 709/203; 709/201; 709/223; 709/224; 715/734; 715/744; 358/1.15; 358/1.16; 358/403

(58) Field of Classification Search  
USPC ............... 709/203, 226, 233, 201, 223, 224; 707/695, 783; 358/1.2, 1.14, 1.15, 358/1.16, 403; 715/734, 744  
See application file for complete search history.

(56) References Cited

U.S. PATENT DOCUMENTS

| | | | | |
|---|---|---|---|---|
| 5,813,009 A | * | 9/1998 | Johnson et al. | 707/695 |
| 6,021,437 A | * | 2/2000 | Chen et al. | 709/224 |
| 6,418,474 B1 | * | 7/2002 | Morris | 709/233 |
| 8,069,243 B2 | * | 11/2011 | Kunitake et al. | 709/225 |
| 8,245,139 B2 | * | 8/2012 | Michelman | 715/734 |
| 2004/0140361 A1 | * | 7/2004 | Paul et al. | 235/462.45 |
| 2005/0248806 A1 | * | 11/2005 | Klein et al. | 358/1.15 |
| 2006/0087680 A1 | * | 4/2006 | Maeda | 358/1.15 |
| 2006/0140494 A1 | * | 6/2006 | Ishikawa | 382/239 |
| 2006/0244831 A1 | * | 11/2006 | Kraft et al. | 348/157 |
| 2007/0162308 A1 | * | 7/2007 | Peters | 705/2 |
| 2007/0211265 A1 | * | 9/2007 | Tanimoto | 358/1.2 |
| 2007/0226395 A1 | * | 9/2007 | Mejias Butron | 711/4 |
| 2007/0233782 A1 | * | 10/2007 | Tali | 709/203 |
| 2007/0299880 A1 | * | 12/2007 | Kawabe et al. | 707/200 |
| 2007/0299969 A1 | * | 12/2007 | Kunitake et al. | 709/225 |
| 2009/0116052 A1 | * | 5/2009 | Matsuzawa | 358/1.14 |
| 2009/0204589 A1 | | 8/2009 | Soga | |
| 2010/0262652 A1 | * | 10/2010 | Soga | 709/203 |
| 2010/0269049 A1 | * | 10/2010 | Fearon | 715/744 |
| 2011/0047466 A1 | * | 2/2011 | Michelman | 715/734 |
| 2013/0185331 A1 | * | 7/2013 | Conemac | 707/783 |

FOREIGN PATENT DOCUMENTS

| | | |
|---|---|---|
| JP | 2000307782 A | 11/2000 |
| JP | 2006-287389 A | 10/2006 |
| JP | 2007-272650 A | 10/2007 |

* cited by examiner

*Primary Examiner* — Thu Ha Nguyen  
(74) *Attorney, Agent, or Firm* — Fitzpatrick, Cella, Harper & Scinto

(57) ABSTRACT

In a case where a user scans a document by a MFP or the like, a plurality of specific folders are determined based upon a storage history of the documents which the user has scanned in the past to produce shortcuts of the document scanned at this time in the plurality of determined specific folders.

11 Claims, 12 Drawing Sheets

DOCUMENT MANAGEMENT SYSTEM, DOCUMENT MANAGEMENT METHOD AND RECORDING MEDIUM

BACKGROUND OF THE INVENTION

1. Field of the Invention

The present invention relates to a document management system for determining a storage destination of a scan document from a storage history of the scan document.

2. Description of the Related Art

Recently Web-structuring of an office personal computer (PC) environment has been settled. Followed by it, the Web-structuring of a user interface (UI) in the world of MFP (Multifunction Peripheral) has also advanced, which is becoming one of differential technologies against other companies.

Here, it is usual that a personal computer (PC) is used by each individual and the MFP is used in cooperation by plural persons. Therefore, there exists a basic need of minimizing hours when the individual occupies the MFP. Hereby attention is paid on an efficient use method for realizing each characteristic of PC and the MFP connected to each other through Web. As a function corresponding to this, the present MFP is designed to be capable of storing scanned documents in a folder of a document management server or a file server. In this case, a storage destination folder of the document management server is selected in the MFP or the storage destination folder is in advance set in a client PC to select a setting button thereof from a browser of the MFP, thereby making it possible to store the scanned document in the folder in the document management server or the like.

For example, Japanese Patent Laid-Open No. 2000-307782 has proposed a system where information such as user identification ID, registration date and time, final use date and time and common setting is in advance registered as additional information of the scan setting and by selecting any one of the additional information by a user, the scan setting is efficiently selected.

In a case of storing the document scanned in the MFP in the folder of the document management server or the file server, according to the conventional technology there is a need of whether a user selects the storage destination folder by the MFP for each time of the storing or the storage destination folder is in advance selected in the client PC. That is, the setting of the storage destination for a document to be scanned is required at each time of the scanning the document. Therefore, there is a problem that the user is required to follow a plurality of processes aimed only at storing the scanned document in the folder of the document management server or the file server. Further, in a case of automatically selecting the storage destination or automatically transmitting the scanned document to plural storage destinations for storing, there is a problem that the scanned document is not necessarily stored in a location as expected by a user.

In the technology disclosed in Japanese Patent Laid-Open No. 2000-307782, it is possible to find out with priority a scan setting in which a storage destination matching with a desire of a user is set, from a plurality of scan settings in advance registered. However, the user is required to set the storage destination before the MFP at each time of the scanning.

SUMMARY OF THE INVENTION

A document management system according to the present invention is provided with a document management system in which a client apparatus, a server apparatus and a scanner apparatus are connected through a network, wherein the server apparatus comprises: a receiving unit configured to receive a scan document scanned by the scanner apparatus; a storing unit configured to store the received scan document in a temporary folder; a determining unit configured to determine a plurality of specific folders based upon a storage history of a past scan document for each user; and a shortcut producing unit configured to produce shortcuts of the stored scan document in the plurality of specific folders.

According to the present invention, since the storage destination of the scanned document is determined based upon the storage history of the past scan document of a user, the user is not required to in advance register the storage destination in PC or select the storage destination before the MFP at each time of the storing. Therefore, it is possible to store efficiently the scanned document.

Further features of the present invention will be become apparent from the following description of exemplary embodiments (with reference to the attached drawings).

DESCRIPTION OF THE EMBODIMENTS

First Embodiment

A first embodiment of the present invention will be explained with reference to FIG. 1 to FIG. 11.

(System Arrangement)

Figure 1:
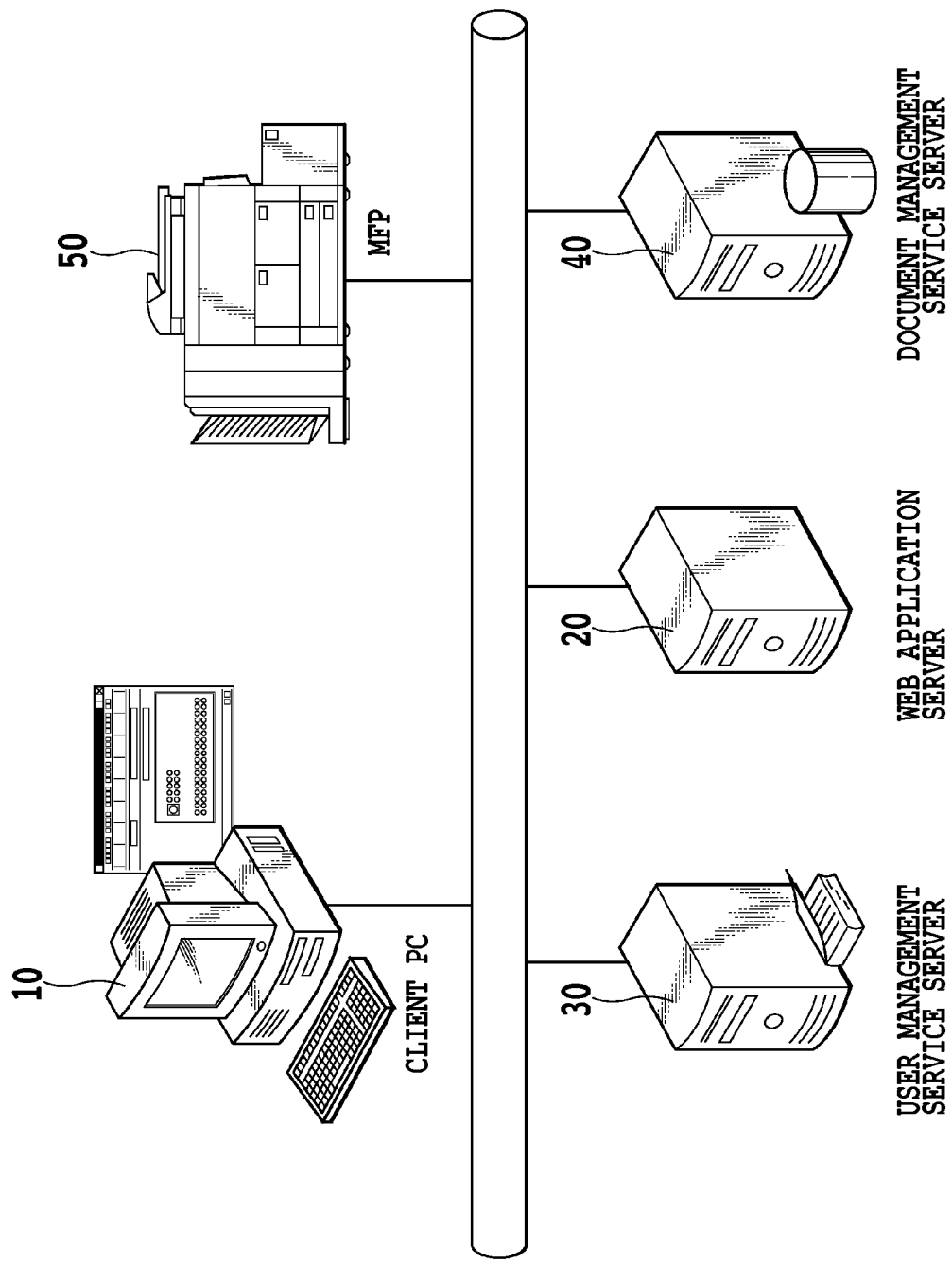
FIG. 1 is a system arrangement diagram showing a document management system according to an embodiment of the present invention.

FIG. 1 is a system arrangement diagram showing a document management system according to the first embodiment of the present invention. In the document management system, a client PC 10, a Web application server (Web server) 20, a user management service server 30, a document management service server 40 and a MFP 50 are connected through a network.

A user can have access to each server via a browser from the client PC 10, and further, the user can have access to each server via UI (user interface) of the MFP 50 equipped with a browser display function. The MFP 50 is equipped with a printer function, and further, functions of copy, FAX and scanner.

The Web application server 20 is a server for providing Web applications. The user management service server 30 is a server for managing information of a user. The document management service server 40 is a server for storing/managing documents.

Here, in FIG. 1, the Web application server 20, the user management service server 30 and the document management service server 40 are respectively shown as separate servers. However, they are not necessarily independent servers, and may be configured by one server in which functions of the respective servers are integrated.

In addition, a user has access to the respective servers through the client PC 10 or the MFP 50 provided to be separated from the respective servers, but any one or all of the servers may be provided with the function of the client PC in addition to its own function.

A document is scanned by the MFP 50, but a scanner may be provided in the client PC 10.

The document management system according to the present embodiment is configured such that a user has access to the Web application server 20 via the browser in the client PC 10 and via the user interface (UI) equipped with the browser display function in the MFP 50.

Further, the document management system may be configured, for example, such that an exclusive client application is arranged in the client PC 10 and the MFP 50 and a user has access to each server via this exclusive client application. In this case, the document management service server 40 and the exclusive client application may be communicated to each other by omitting the Web application server 20.

It should be noted that a user having access to the Web application server 20 from the MFP 50 and a user having access to the Web application server 20 from the client PC 10 may be the same or different. That is, a user storing the scan document and a user having access to the stored scan document may not be the same.

(Hardware Arrangement)

Figure 2:
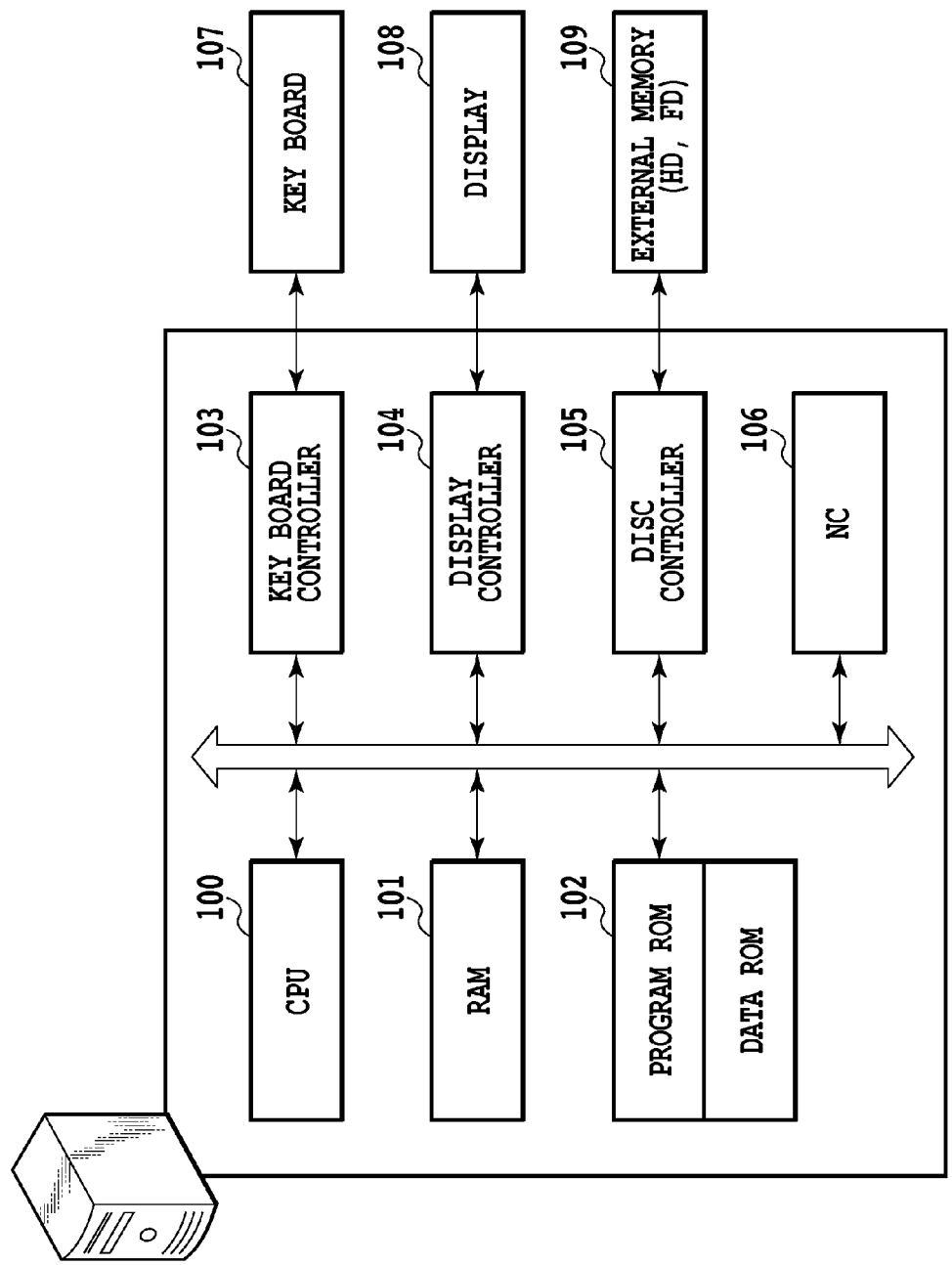
FIG. 2 is a hardware arrangement diagram showing a client PC and each server constituting the document management system according to the embodiment of the present invention.
Figure 3:
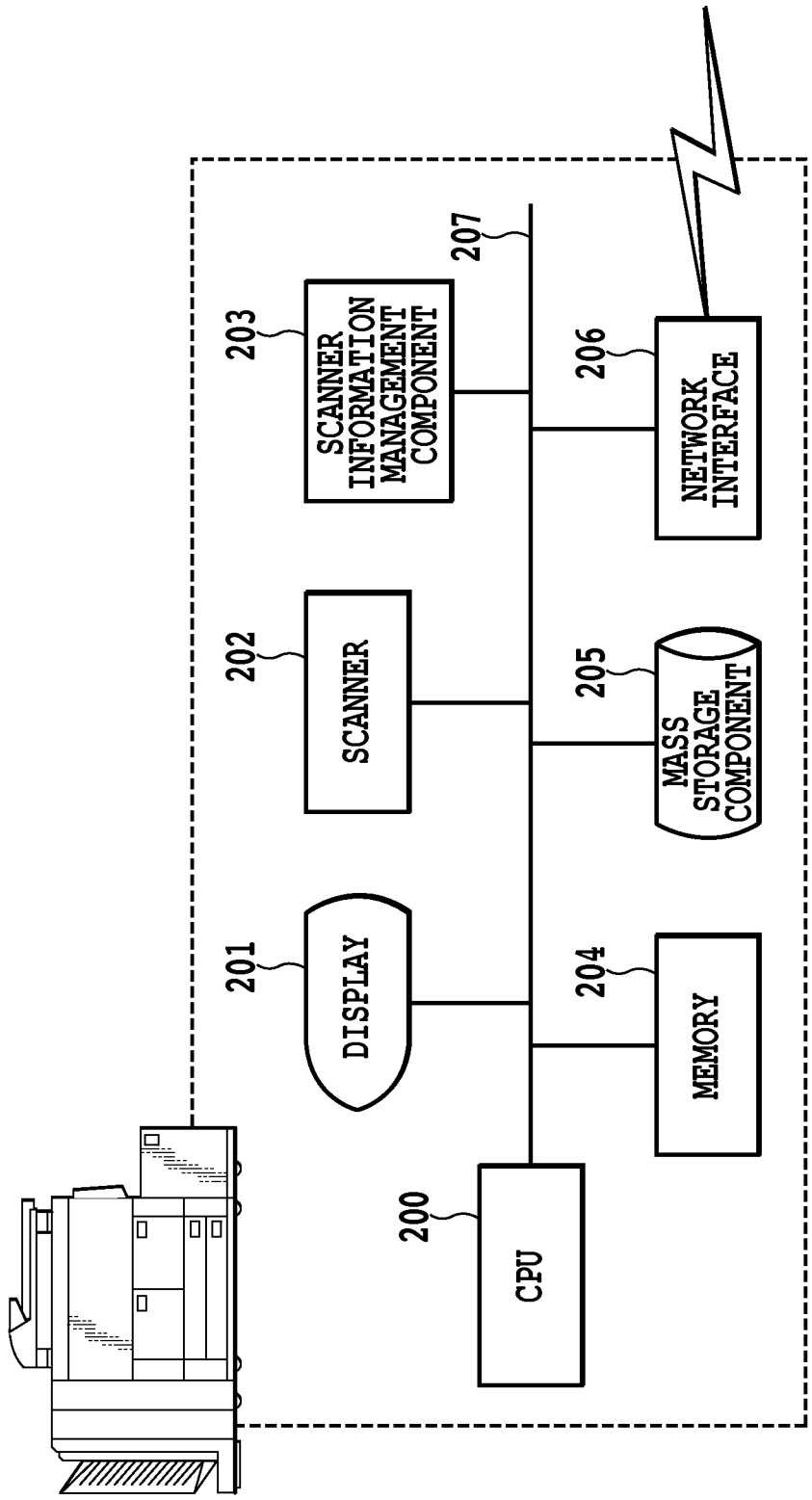
FIG. 3 is a hardware arrangement diagram showing a MFP constituting the document management system according to the embodiment of the present invention.

FIG. 2 is a hardware arrangement diagram showing the client PC and each server constituting the document management system according to the present embodiment. FIG. 3 is a hardware arrangement diagram showing the MFP constituting the document management system according to the present embodiment. The hardware arrangement diagrams shown in FIG. 2 and FIG. 2 are hardware arrangement diagrams showing a general information processing apparatus and the MFP, and the hardware arrangement of the general information processing apparatus may be applied to the client PC, the server and the MFP in the present embodiment.

In FIG. 2, CPU 100 executes programs stored in ROM for a program of ROM 102 or an OS or an application loaded in RAM 101 from a hard disc 109. It should be noted that OS is an abbreviation of an operating system operating on a computer. The processing of each flow chart to be described later can be realized by execution of a program. RAM 101 functions as a main memory, a work area and the like of CPU 100. A key board controller 103 controls key input from a key board 107 or a pointing device (not shown). A display controller 104 controls displays of various displays 108. A disc controller 105 controls data access in a hard disc (HD) 109, a floppy (registered trademark) disc (FD) or the like for storing various data. NC 106 is connected to a network to execute the communication control processing with other devices connected to the network.

In FIG. 3, CPU 200 is connected via an internal bus 207 to each component to be described later to control the MFP. An UI screen such as a touch panel is displayed on a display 201. A user performs a desired operation or the like via the UI screen displayed on the display 201. A scan of a document is performed with a scanner 202 and a scanner information management component 203 manages and retains information of the function and state of the scanner 202.

A memory 204 stores various commands (including an application program) which CPU 200 executes to control the MFP 50 and a mass storage component 205 temporarily stores data scanned by the scanner 202. In addition, a network interface 206 transmits/receives signals via LAN according to CPU 200.

(Software Arrangement)

Figure 4:
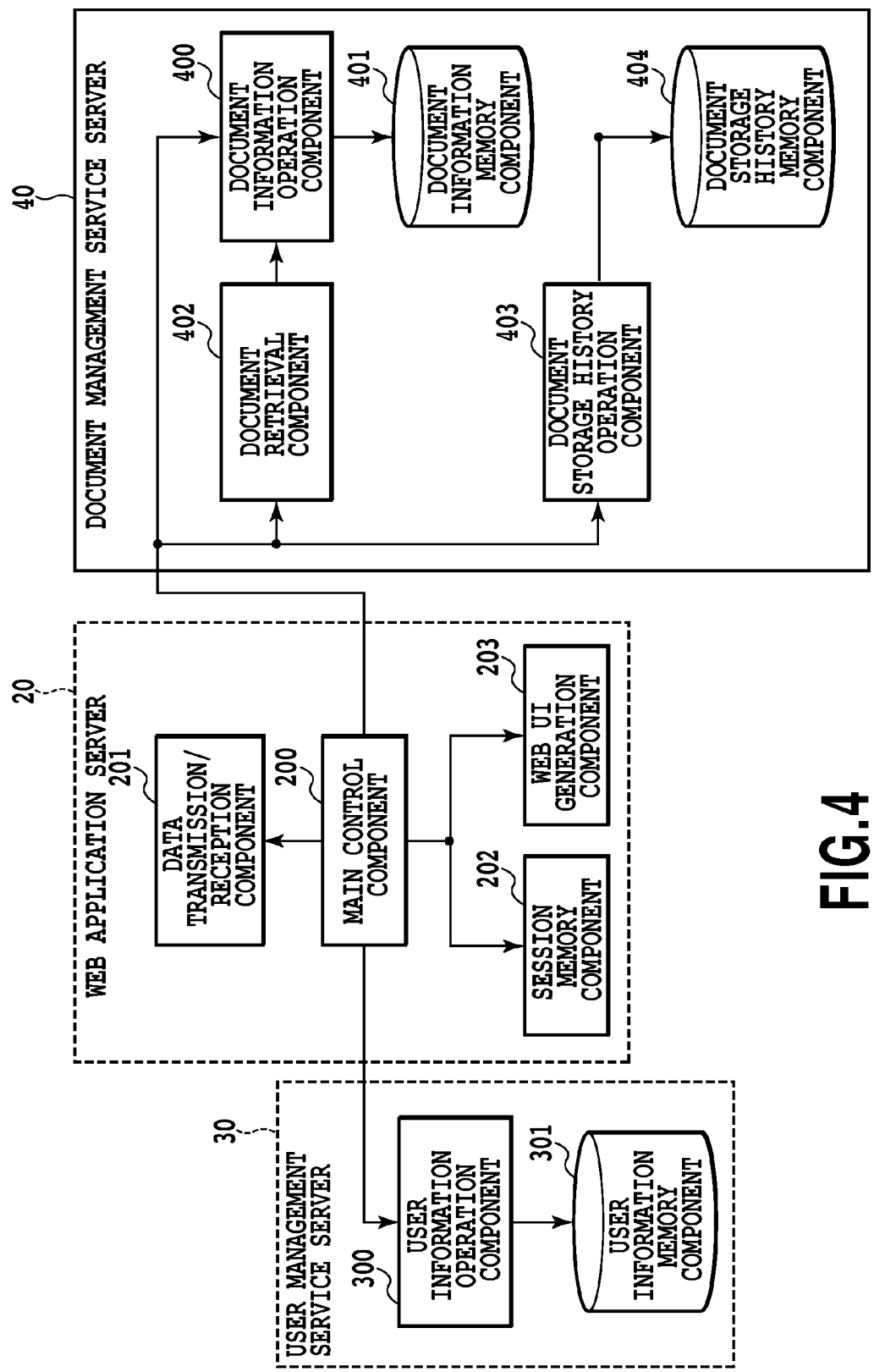
FIG. 4 is a software arrangement diagram showing the document management system according to the embodiment of the present invention.

FIG. 4 is a software arrangement diagram of the document management system according to the present embodiment, which shows software arrangements in the Web application server 20, the user management service server 30 and the document management service server 40.

A main control component 200 controls the entirety of the document management system according to the present embodiment and performs instructions and management to each component.

A data transmission/reception component 201 receives commands and various data of the client PC 10 and the MFP 50 from a user via the browser. In addition, the data transmission/reception component 201 transmits the commands and the various data to the client PC 10 and the MFP 50 according to instructions of the main control component 200.

After a user has access to the present document management system via the browser from the client PC 10 and the MFP 50, a session memory component 202 generates session information to show the access by the same user. Further, until the user stops the access to the present document management system (logout) or the session is disconnected by automatic timeout or the like, the session memory component 202 retains various kinds of information to be repeatedly used by being associated with the session information.

A Web UI generation component 203 generates Web UI (for example, HTML) in accordance with a situation according to an instruction of the main control component 200. Here, Web UI generated by the Web UI generation component 203 is not limited to HTML, and a script language such as Java (registered trademark) may be embedded in Web UI.

A user information operation component 300 performs operations such as extraction or edition of users accessible to the document management system and user characteristics (print setting information and the like) which are stored in a user information memory component 301, according to an instruction from the main control component 200. It should be noted that in regard to the user management, the management specific to the present document management system is not required, but the well known technology may be used. That is, the user information operation component 300 may be tied to an active directory or a lightweight directory access protocol (LDAP) to store only user characteristics in the user information memory component 301.

A document information operation component 400 performs registration, storage, extraction, edition and the like of substances of documents and document attributes including index information stored in a document information memory component 401 according to an instruction from the main control component 200.

A document retrieval component 402 determines a method of retrieving documents according to an instruction from the main control component 200 and acquires a retrieval result from the document information memory component 401 through the document information operation component 400.

A document storage history operation component 403 performs operations such as addition, storage, extraction, edition and the like of documents stored in the document information memory component 401 to a document storage history memory component 404 according to an instruction from the main control component 200.

It should be noted that as described above, the functions of the respective components may be realized by a single server. For example, the software may be configured such that all the functions of the respective components are realized in the Web application server 20.

Hereinafter, the storage processing of scan documents in the document management system according to the present embodiment will be in detail explained with reference to FIG. 1 to FIG. 8.

(Storage of Scan Document)

Figure 5:
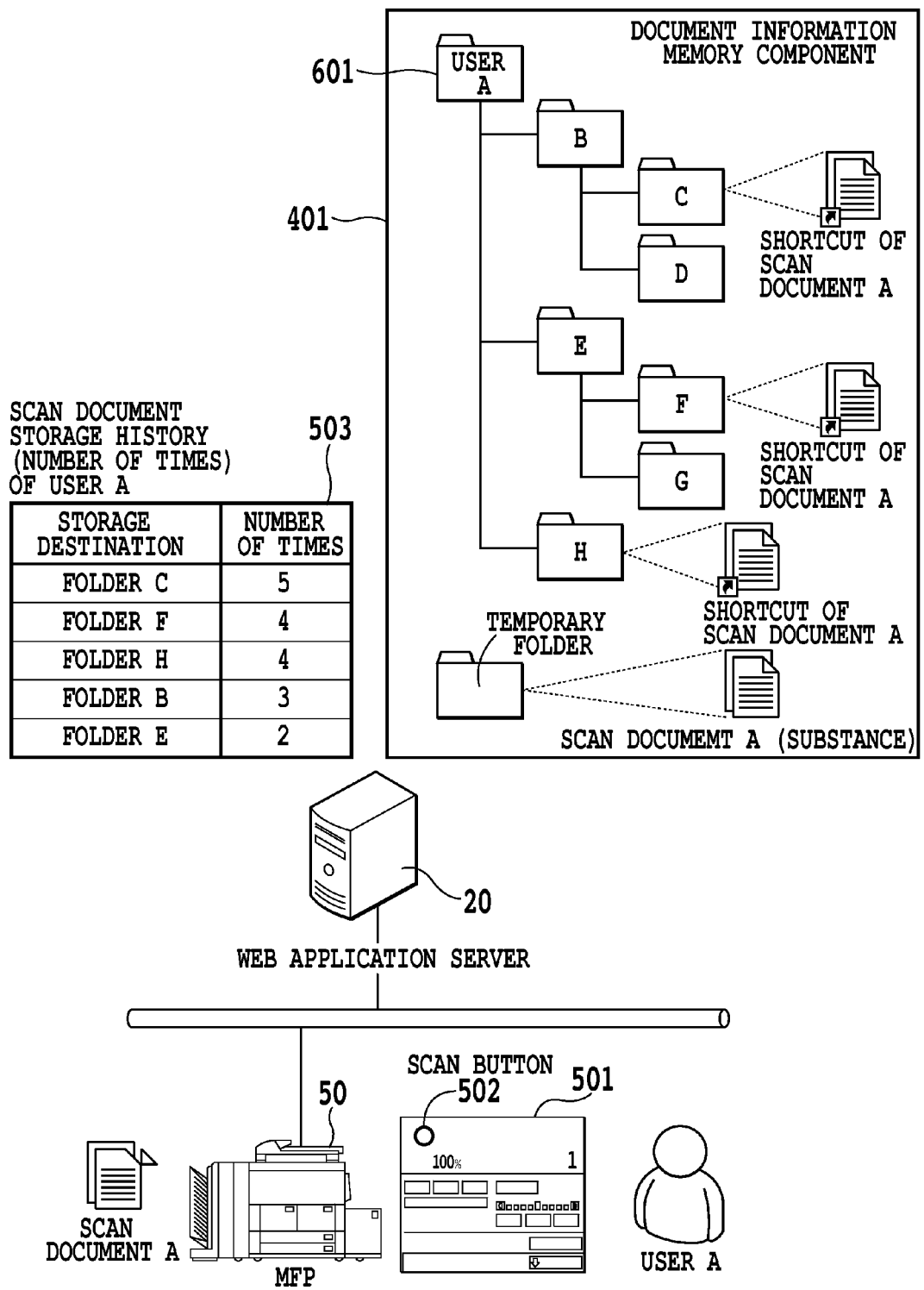
FIG. 5 is a conceptual diagram showing a state where scan documents are stored in a document management system according to a first embodiment of the present invention.
Figure 6:
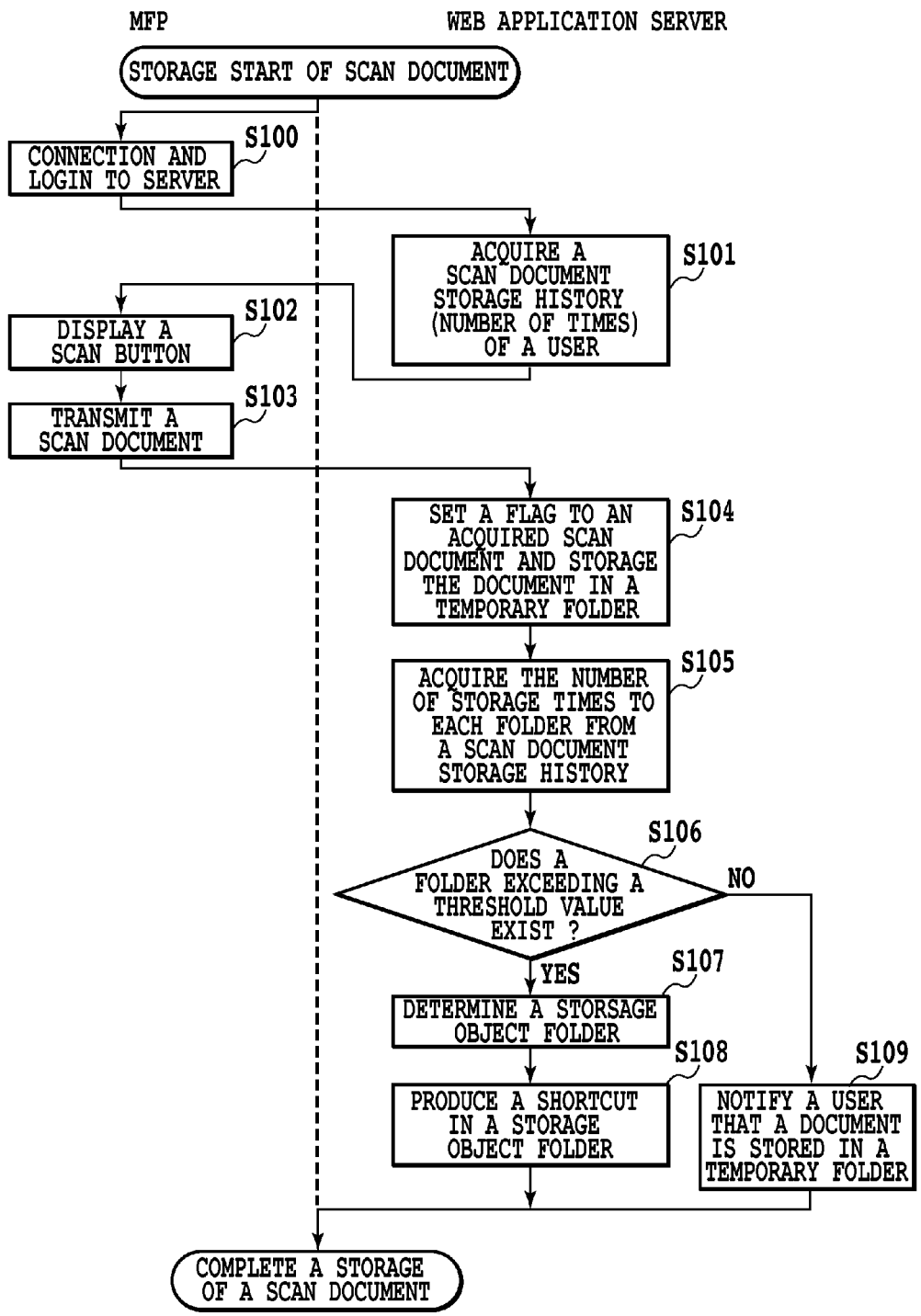
FIG. 6 is a flow chart showing the processing of storing shortcuts or the like of the scan documents in the document management system according to the first embodiment of the present invention.

FIG. 5 is a conceptual diagram showing a state where scan documents are stored in the document management system according to the present embodiment, and FIG. 6 is a flow chart showing the processing for storing scan documents. Hereinafter, the storage processing will be in detail explained with reference to FIG. 5 and FIG. 6.

It should be noted that since the user management service server 30 and the document management service server 90 perform predetermined functions according to control of the main control component 200 in the Web application server 20, in FIG. 6 they are not shown as independent structures for omission.

At step 100, the MFP 50 receives user information (for example, user ID or password) of a user for login via a UI screen and performs connection to the Web application server 20 and a login authentication. Specially transmission of the received user information and the instruction of the login authentication are performed to the user information operation component 300 in the user management service server 30 from the main control component 200, and the user information operation component 300 determines YES/NO of the login by using the user information memory component 301. The authentication result is transmitted to the main control component 200. In the present embodiment, the login authentication is made to a user A and the login is permitted.

At step 101, the Web application server 20 acquires a scan document storage history 503 of the user A from the document storage history memory component 904 in the document management service server 40. The scan document storage history 503 is made by recording the number of times of the storage for each folder of the documents scanned in the past in the document storage history memory component 909, for each user. An example of the scan document storage history 503 records an event that the user A has stored scan documents in a folder C five times, in a folder F four times, in a folder H four times, in a folder B three times and in a folder E twice in the past.

At step 102, the MFP 50 acquires a scan button 502 from the Web application server 20 via the browser and displays the scan button 502 in a screen 501 on the display 201. Accordingly the scan button 502 displayed in the screen 501 on the display 201 is different from a button originally equipped in the MFP 50 for scan operation. When the scan button 502 displayed at step 102 is selected by the user A, the MFP 50 performs a scan of a document by the scanner 202. In the present embodiment, a document A is supposed to be scanned.

At step 103, the MFP 50 transmits the scan document A to the Web application server 20.

At step 104, the Web application server 20 acquires the scan document A via the data transmission/reception component 201 and stores the scan document A in a temporary folder inside the document information memory component 201 in the document management service server 40. In addition, at the storing, an attribute flag showing that the scan document A is a scanned document file is set to this scan document A. The attribute flag is information composed of a binary "1" or "0", wherein "1" shows a scan document and "0" shows a document other than the scan document. It should be noted that it is only required that some information enables the scan document to be distinguished is provided at the storing, and the attribute flag in the present embodiment is simply an example thereof. In addition, in regard to a file name of the scan document, the date and time at the scanning or a document name in advance set by a user may be set.

Next, at step 105, the Web application server 20 extracts the number of times of the storage of the scan document by the user A for each folder from the scan document storage history 503 acquired at step 101.

In addition, at step 106, the Web application server 20 compares the extracted number of times of the storage of the scan document for each folder with a threshold value to determine whether or not a folder having the number of times of the storage exceeding the threshold value exists. In the present embodiment, "4" is set as the threshold value, but a numerical value of the threshold value may be set to any value. As a result of the comparison, when it is determined that the folder having the number of times of the storage exceeding threshold value exists, the process goes to step 107.

At step 107, the Web application server 20 determines the folder having many numbers of times of the storage of the scan document (the folder having four or more numbers of times of the storage) as a storage object folder. The storage object folder is a shortcut of the received scan document. In the present embodiment, the folder C having five numbers of times of the storage, the folder F and the folder H each having four numbers of times of the storage are determined as the storage object folders.

Subsequently at step 108, the Web application server 20 produces the shortcut of the scan document A stored in the temporary folder in each storage object folder determined at step 107. That is, the shortcut of the scan document A the substance of which is stored in the temporary folder is produced in the folder C, the folder F and the folder H. On this occasion, it may be determined whether the shortcut is open only to the user who has performed the scan or also to other users as a common scan document, by the setting of the user. On the other hand, when at step 106 it is determined that the folder having the number of times of the storage exceeding threshold value does not exist, the process goes to step 109.

At step 109, the Web application server 20 acquires a mail address of the user A from the user management service server 30 and notifies the user A of the fact that the scan document A is stored in the temporary folder. A message is described in the mail to be notified for promoting the user A to designate the storage destination of the scan document A.

Incidentally explaining, the user receives the mail in the client PC 10 and designates the storage destination of the scan document A. When the storage destination is designated, the main control component 200 in the Web application server 20 instructs the document management server 40 to transfer the scan document A in the temporary folder to the designated storage destination. The document management service server 40 transfers the scan document A to the designated folder on the basis of the instruction. It should be noted that although not shown in a flow chart in FIG. 6, when the processing of transferring the scan document A from the temporary folder to the storage destination designated by the user is completed, the storage history is updated similarly to step 212 in FIG. 8 in the arrangement processing of the scan document to be described later.

By the processing as described above, as to the scan document scanned in the MFP 501, the shortcut of the scan document is produced in the storage destination considered to be the most suitable for the user from the storage history of the past scan document.

It should be noted that in the above example, the shortcut of the scanned document is produced and stored in the storage object folder, but, not the shortcut, but the substance of the scan document file may be stored (in a case of plural storage object folders, the substance may be copied and stored by the numbers of the folders). In this case, it is not necessary to store the substance of the scanned document in the temporary folder.

In this way, the shortcut or the like of the automatically scanned document is produced and stored in all the folders in which the number of times of the storage of the past scan document is more than a predetermined threshold value. Therefore, it is not necessary for a user to in advance set the storage destination of the scanned document by the client PC 10 or set the storage destination before the MFP. The user desired to perform operations such as the browsing and the editing of the scan document after scanning is only required to have access to a folder which is regularly and frequently used by himself or herself.

Particularly in a case of producing the shortcut in a small data size which is stored in the storage object folder, a limited folder capacity can not be pressed.

It should be noted that at step 103 as described above, the user can designate a specific folder as the storage destination of the scan document A. In a case where the user designates the specific storage destination, information of the storage destination folder is registered in the storage history and is used in the determination processing of the storage object folder at the next and thereafter.

(Arrangement of Scan Document)

By the present invention, the scan document is automatically stored in plural folders (storage object folders) and a user may continue to use the folder as it is. Particularly in a case of the shortcut, there does not occur almost any practical problem. However, at a point where the user uses the shortcut of any folder for performing any operation to a scan document, the user recognizes which folder should be opened for accessing the scan document. In addition, even if a user who has performed a scan of a document is different from a user who has accessed the scan document, since both the users are supposed to have some connection therebetween, it is possible to share between users the information about use of the shortcut in which folder. Therefore, at a point where some shortcut is used, the need of leaving the shortcut for accessing the same scan document in the other folder becomes small after this point. In addition, in view that a capacity of the temporary folder is limited, it is preferable to transfer the substance of the scan document from the temporary folder as needed.

Therefore, hereinafter, in a case where a user has access to the shortcut in any one of the folders after the aforementioned storage processing is executed, the processing of arranging the shortcuts or the like will be explained.

Figure 7:
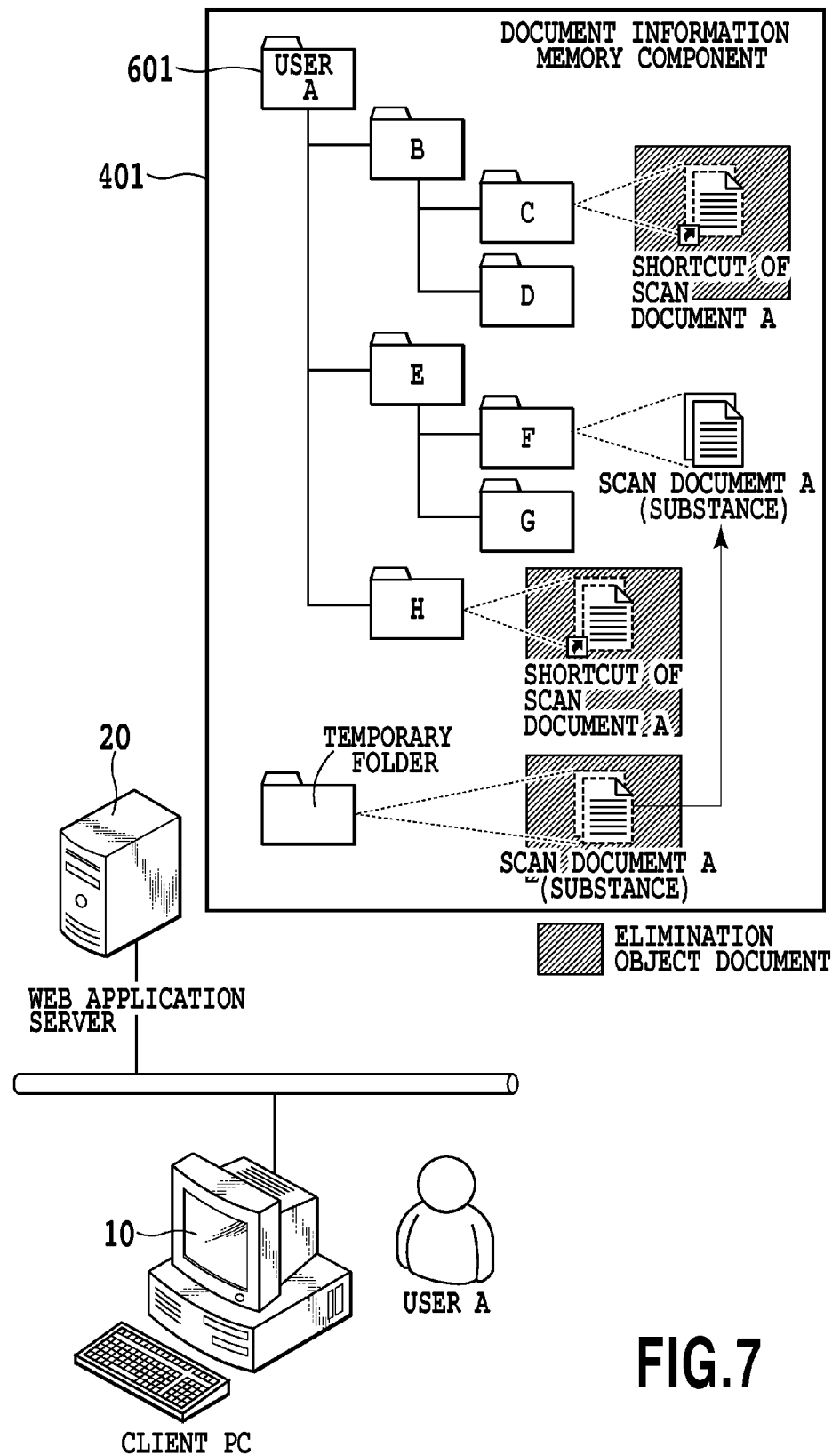
FIG. 7 is a conceptual diagram showing a state of arranging the scan documents in the document management system according to the first embodiment of the present invention.
Figure 8:
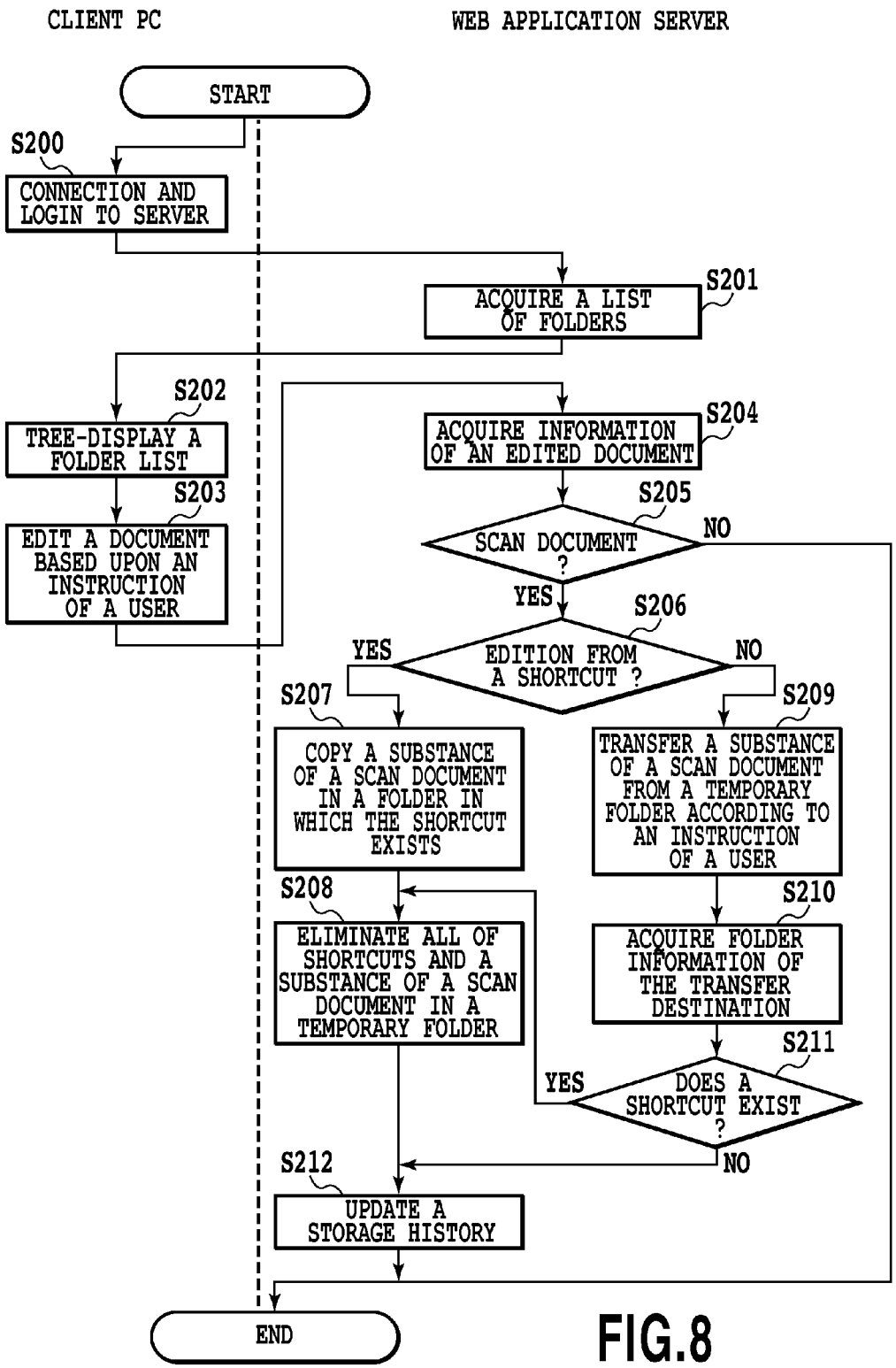
FIG. 8 is a flow chart showing the processing of arranging the shortcuts or the like of the scan documents in the document management system according to the first embodiment of the present invention.

FIG. 7 is a conceptual diagram showing a state for arranging the shortcuts or the like of the scan documents in the present document management system, and FIG. 8 is a flow chart showing the processing for arranging the shortcuts or the like of the scan documents. It should be noted that FIG. 7 and FIG. 8 are shown on the basis of the special example according to the user A shown in FIG. 5 described above. At step 200, the client PC 10 receives user information (for example, user ID or password) of a user (user A) for login via the key board 107 and performs connection to the Web application server 20 and a login authentication. Since a detail of the login authentication is not different from a case of the storage processing in FIG. 6, the detail is omitted, but the login by the user A is deemed to be permitted.

At step 201, the Web application server 20 acquires list information 601 of folders in which the document files or the like in regard to the user A are stored, from the document information memory component 401 in the document management service server 40 and tree-displays the list information 601 on the display 108. In the present embodiment, a list of the folder B to the folder H and the temporary folder is tree-displayed.

At step 203, the client PC 10 executes the processing according to an instruction of a user to the corresponding object document. That is, the user opens any folder from the listed folders and performs operations such as browsing or editing in regard to a desired document in the folder. Here, it is assumed that the user A opens the folder F and performs an editing operation to the scan document A in the temporary folder by using the shortcut of the scan document A in the folder F. It should be noted that since in each folder, usual document files can be naturally stored in addition to the shortcut of the scan document produced and stored at step 108 in FIG. 6, the user can perform operations such as browsing or editing also to the usual document files.

At step 204, the Web application server 20 acquires information of the document (information in regard to a file name and an attribute flag) in which operations such as browsing and editing are performed at step 203.

At step 205, the Web application server 20 checks whether the attribute flag contained in the acquired information is "1" or "0" to determine whether or not the document edited or the like is a scan document. When it is determined that the edited document is not the scan document, the process ends. When it is determined that the attribute flag is "1" and the edited document is the scan document, the process goes to step 206. Here, since the edition is performed to the scan document A, the process goes to step 206.

In a case where at step 206, the Web application server 20 determines that operations such as browsing and editing are performed by using the shortcut, the process goes to step 207, and in a case where at step 206, it is determined that the operations are performed directly to the substance of the temporary folder, the process goes to step 209. Here, since the edition of the scan document A is performed by using the shortcut stored in the folder F, the process goes to step 207.

At step 207, the Web application server 20 produces a copy of the substance of the scan document stored in the temporary folder, in the folder in which the shortcut used for the editing exists. Here, a copy of the substance of the scan document A is produced in the folder F. When the production of the copy is completed, the process goes to step 208. It should be noted that in the present embodiment, the timing for copying the substance in the folder in which the used shortcut exists is defined as timing immediate after the shortcut is used. However, for example, a threshold value may be applied to the number of use times of the shortcut to copy the substance at a point where the number of the use times exceeds the threshold value. Further, the substance may be copied, not on condition of the number of the use times, but on condition that a specific operation (for example, edition of the content) is performed. These settings can be arbitrarily made by a user.

At step 208, the Web application server 20 eliminates all the shortcuts of the edited scan documents and the substance of the scan document stored in the temporary folder. In a case of the present embodiment, the shortcut of the scan document produced in each of the folder F, the folder C and the folder H and the substance of the scan document A existing in the temporary folder is eliminated. It should be noted that the timing of the elimination can be arbitrarily set, for example, the timing of the elimination may be determined by designating the timing, such as after the given data and time elapse after copying the substance from the temporary folder. When the elimination is completed, the process goes to step 212.

On the other hand, in a case where an operation such as editing is performed to the substance in the temporary folder, the Web application server 20 transfers the substance of the scan document from the temporary folder according to an instruction of a user at step 209. Specially, first to the user, a massage instructing that in which folder the scan document edited or the like at this time should be stored is displayed on the display 108 in the client PC 10. Further, upon receiving the instruction of designating the storage destination via the key board 107 or the like by the user, the substance of the scan document is transferred to the folder of the designated storage destination.

At step 210, the Web application server 20 acquires information of the folder in the transfer destination and determines whether or not the shortcut of the scan document exists in the folder in the transfer destination. In a case where the shortcut exists, the process goes to step 208 for eliminating the shortcut or the like which has become unnecessary since the substance is transferred. In a case where the shortcut does not exist, the process goes to step 212 for updating the storage history in the folder to which the substance is transferred this time.

At step 212, the Web application server 20 adds "1" to the number of the storage times of the folder in which the substance is determined to be stored at step 207 and at step 209 to update the storage history. In the present embodiment, "1" is added to the number of the storage times of the folder F to make "5" to update the storage history.

It should be noted that in a case where not the shortcut, but the copy of the scan document is produced in the storage object folder, the following processing (not shown) is executed in place of the processing from step 206 to step 211. That is, when at step 205 it is determined that the edited document or the like is the scan document, next the processing of eliminating the copy of the scan document in the other folder which is not used in the editing is executed. In addition, the update processing of the storage history similar to that at step 212 is executed.

With this processing, the shortcut or the like is arranged at a point where the user performs an operation such as editing to the scan document by using the shortcut from the client PC 10.

It should be noted that, as described above, the user storing the scan document is not necessarily the same as the user performing an operation such as editing to the stored scan document. For example, a colleague of a user who has executed the previous storage processing may possibly use the stored scan document. A user scanning a document for storing and editing may be different from a user performing an operation such as editing to the stored scan document. Even in this case, since the folder in which the shortcut is produced and stored is limited to a folder which the user who has performed a scan frequently uses, inconvenience does not occur for the user who has performed the scan.

Second Embodiment

A second embodiment of the present invention will be explained with reference to FIG. 1 to FIG. 12. A point thereof different from the first embodiment is a point where the storage history of the document used upon determining the storage destination of the scanned document is not the number of the storage times, but the storage date and time. Hereinafter, a difference point from the first embodiment will be mainly explained.

(Storage of Scan Document)

Figure 9:
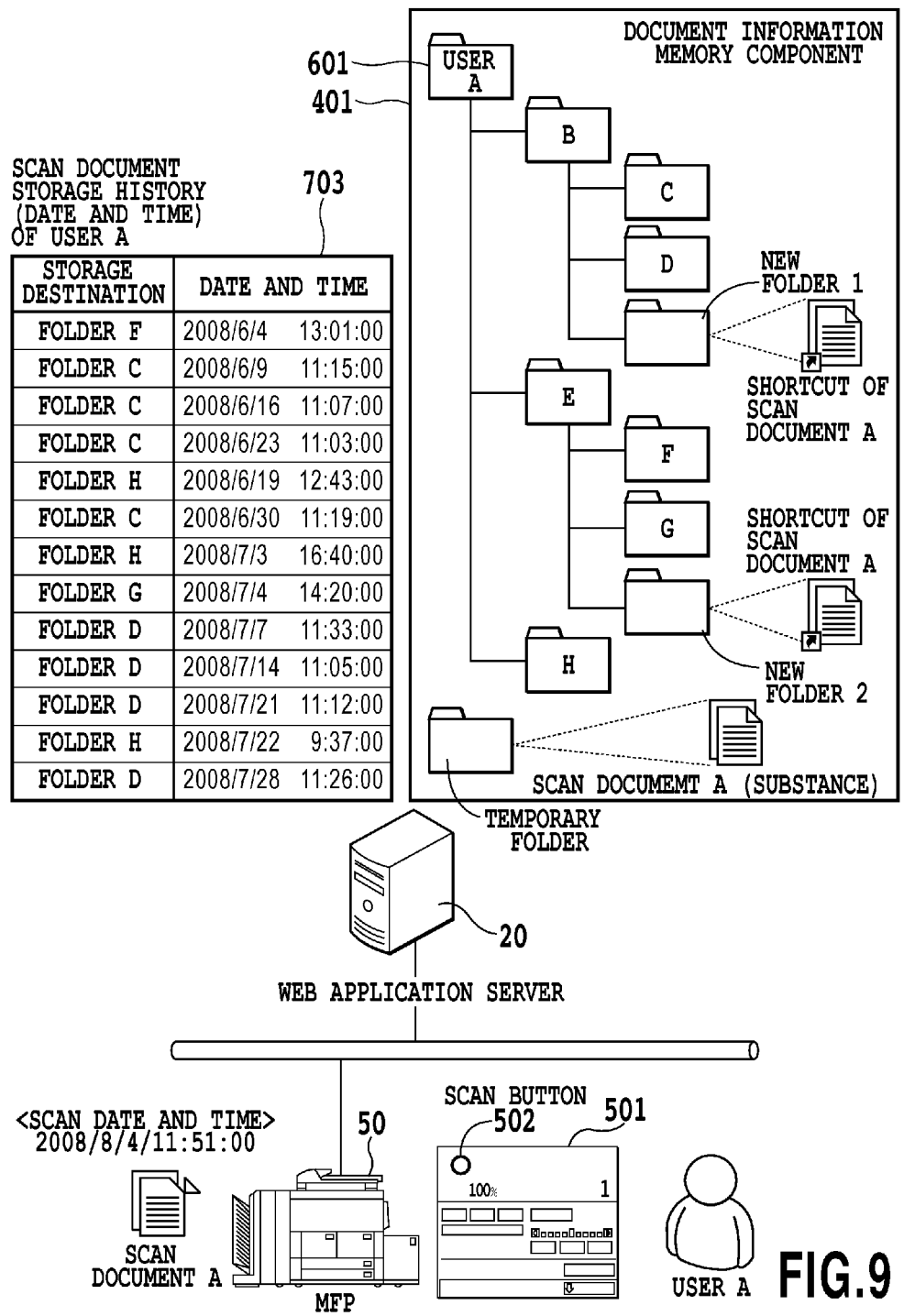
FIG. 9 is a conceptual diagram showing a state where scan documents are stored in a document management system according to a second embodiment of the present invention.
Figure 10:
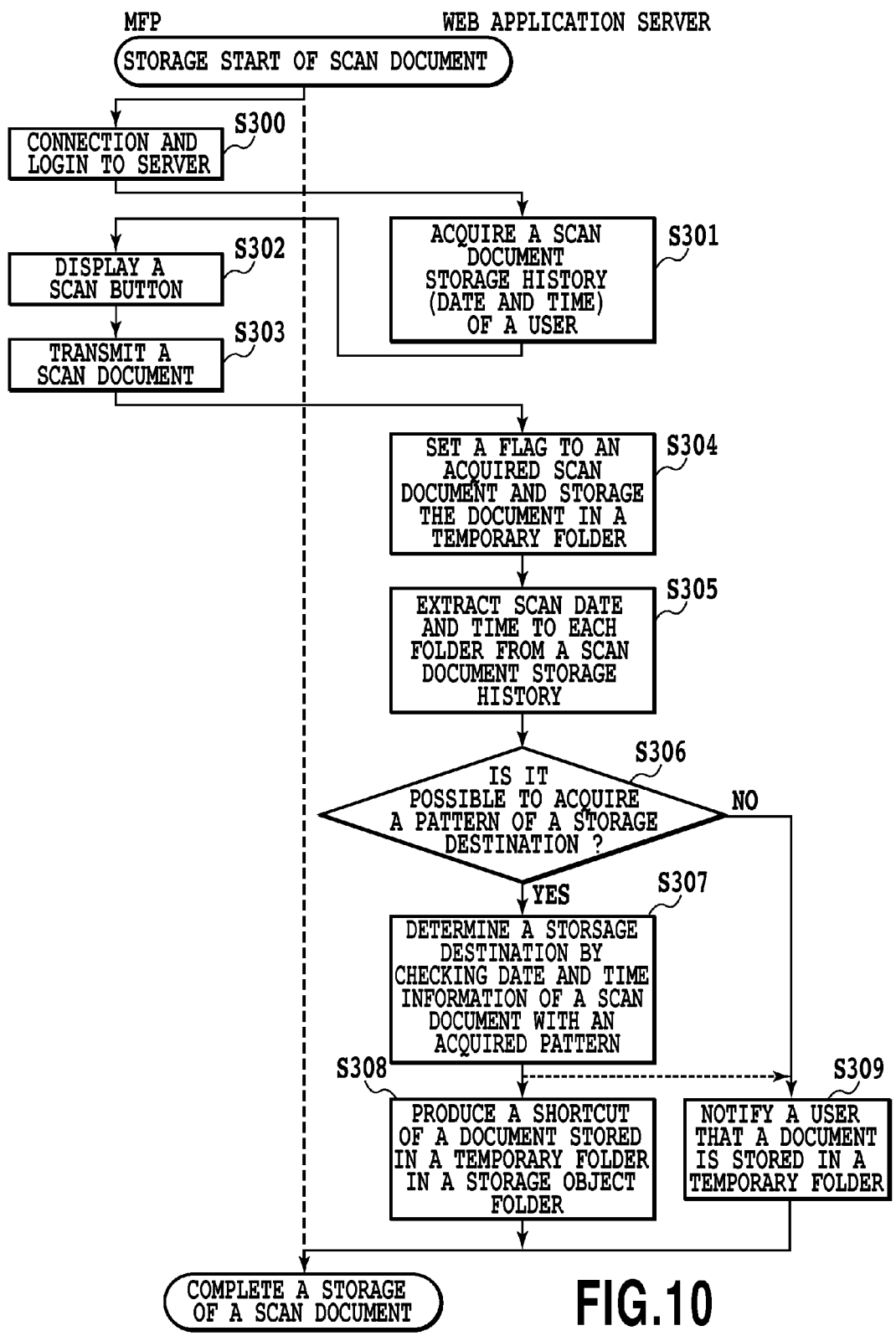
FIG. 10 is a flow chart showing the processing of storing the scan document in the document management system according to the second embodiment of the present invention.

FIG. 9 is a conceptual diagram showing a state where a scan document is stored in the document management system according to the present embodiment, and FIG. 10 is a flowchart showing the processing for storing a scan document. Hereinafter, this processing will be in detail explained with reference to FIG. 9 and FIG. 10, but points in common with the first embodiment are simplified or omitted.

When the login of a user is permitted at step 300, the Web application server 20 acquires a scan document storage history 703 of the user who has succeeded in the login at step 301. The scan document storage history acquired in the present embodiment records the scan data and time of the past scan document for each user. In a case of the scan document storage history 703, the history of the scan data and time of the scan document is in time series recorded, starting with 13:01 on Jun. 4, 2008 of the folder F as the record of the oldest scan data and time.

The Web application server 20 which has received a scanned document (here, scan document A) via step 302 and step 303 sets a flag "1" to the scan document at step 304 and stores the scan document in the temporary folder. A file name at the storing includes in formation of the date and time at the time of performing the scan (scan date and time information). Since the scan date and time of the scan document A in the present embodiment is 11:51 on Aug. 4, 2008, for example, a file name like "scan 2008-0804-1151" is attached.

Next, at step 305 the Web application server 20 extracts scan date and time of the scan document for each folder from the scan document storage history 703 acquired at step 301.

At step 306 the Web application server 20 analyses the extracted scan date and time for each folder to determine whether or not some regularity can be found out (whether or not a storage destination pattern can be acquired). Here, some regularity means that a given tendency (pattern) exists between the storage destination and the scan date and time of the scan document, for example, a scan is performed between 18 o' clock and 19 o'clock on Friday every week and the corresponding scan document is stored in a specific folder. In a case of the scan document storage history 703 in the present embodiment, documents scanned in the same time zone between 11:00 and 18:59 by an interval of one week are stored for each one month in the folder C and the folder D as the lower folders to the folder B. In addition, documents scanned on the fourth day every month are stored respectively in the folder F and the folder G as the lower folders to the folder E.

As a result, there can be acquired a sum of two storage destination patterns composed of a pattern of storing the scan document in the lower folder to the folder B between 11:00 and 18:59 (on the specific day) by an interval of one week and a pattern of storing the scan document in the lower folder to the folder B on the fourth day every month. In regard to the identification of the storage destination pattern based upon the regularity, a user may set the reference in advance. That is, in a case of desiring the identification as in the case of the present embodiment, a user may set two references composed of a reference of the same time zone by the same interval (the same time zone on the same day every week) and a reference of the same interval (the same date every month). Other than this reference, for example, a reference in regard to the date such as the first Monday every month or the date corresponding to multiple number of five may be set. Further, a reference in regard to hours, such as the time difference is within 30 minutes or morning/afternoon may be set together with or separately from the reference in regard to the above date. In the present embodiment, the regularity is found out in the upper folder levels (levels of the folder B and the folder E), but a layer level of a folder as an object may be in advance set, for example, the regularity may be found out by limiting it to the lowest folder. Further, limiting to a folder in which the date is contained in the folder name, presence/absence of the regularity may be determined in the folder name.

At step 307 the Web application server 20 reads the scan date and time information from the file name of the scan document stored in the temporary folder and checks it with the storage destination pattern analyzed at step 306. In addition, the Web application server 20 determines a storage object folder matching with the storage destination pattern. It should be noted that in a case where a plurality of patterns are acquired at step 306, a plurality of storage object folders in accordance with the patterns are determined. When the storage object folder is determined, the process goes to step 308. In the present embodiment, 11:51 on Aug. 4, 2008 is read as the scan date and time from the file name of the scan document A (scan 2008-0804-1151), which is checked with the two storage destination patterns acquired at step 306. In a case of the scan document A, since the scan date and time are matched with both of the two patterns acquired at step 306, the storage object folder along the two patterns is determined as the storage destination. That is, a new folder at the same layer level with the folder C or the folder D under the folder B or a new folder at the same layer level with the folder F or the folder G under the folder E is determined as the storage destination. It should be noted that although the new folder is determined as the storage destination, the existing folder may be determined as the storage destination depending on a pattern to be checked with. Further, in a case where the scan date and time of the document scanned at this time do not match with any of the acquired storage destination patterns, a new folder which does not belong to the existing folder group (in the present embodiment, a new folder at the same layer level with the folder B, E or H) may be determined as the storage destination or it may be permitted not to determine the storage destination (that is, the production of the shortcut itself is not made). In a case of not determining the storage destination, the process goes to, not step 308, but step 309. An arrow in a broken line of the flow chart in FIG. 10 shows a case of not determining the storage destination.

At step 308 the Web application server 20 produces the shortcut of the scan document stored in the temporary folder at step 304 in the storage object folder determined at step 307. In a case where the determined storage object folder is not the existing folder, a new folder is produced in the determined storage destination and the shortcut is produced in the new folder. In the present embodiment, a new folder 1 is produced under the folder B, a new folder 2 is produced under the folder E, and the shortcut of the scan document A is stored in the respective new folders. It should be noted that a folder name of the new folder may be "new folder N (N is natural number) as in the case of the present embodiment, for example, may be made in the same format with the other folder which is the basis of the regularity. In regard to which folder name is given to the new folder, a user may in advance set it.

At step 309 the fact that the scan document A is stored in the temporary folder is notified to a user by mail.

As described above, the storage processing based upon the history of the storage date and time of the past scanned document to each folder is executed.

(Arrangement of Scan Document)

Next, the processing of arranging shortcuts or the like in the second embodiment will be explained.

Figure 11:
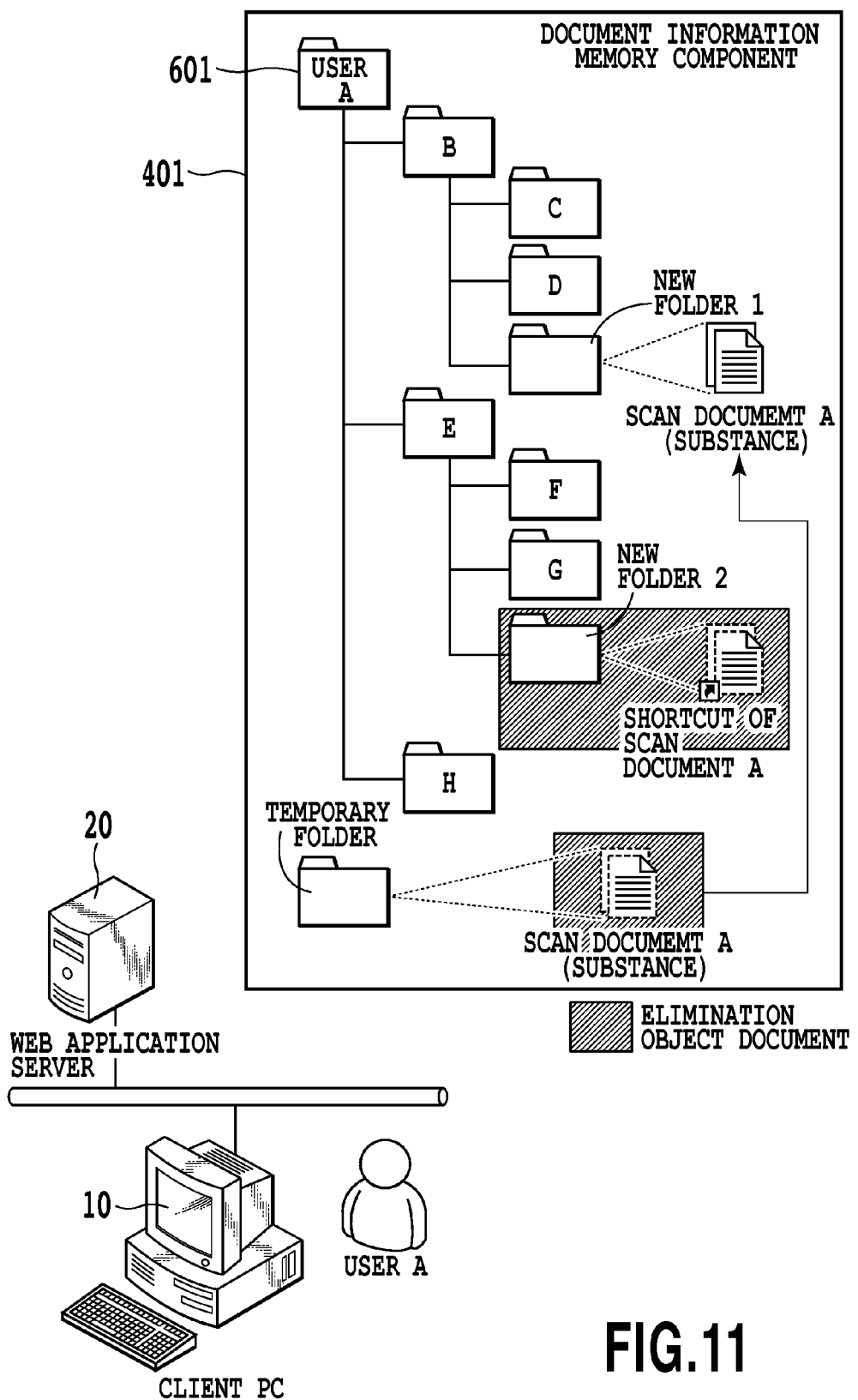
FIG. 11 is a conceptual diagram showing a state of arranging the scan documents in the document management system according to the second embodiment of the present invention.
Figure 12:
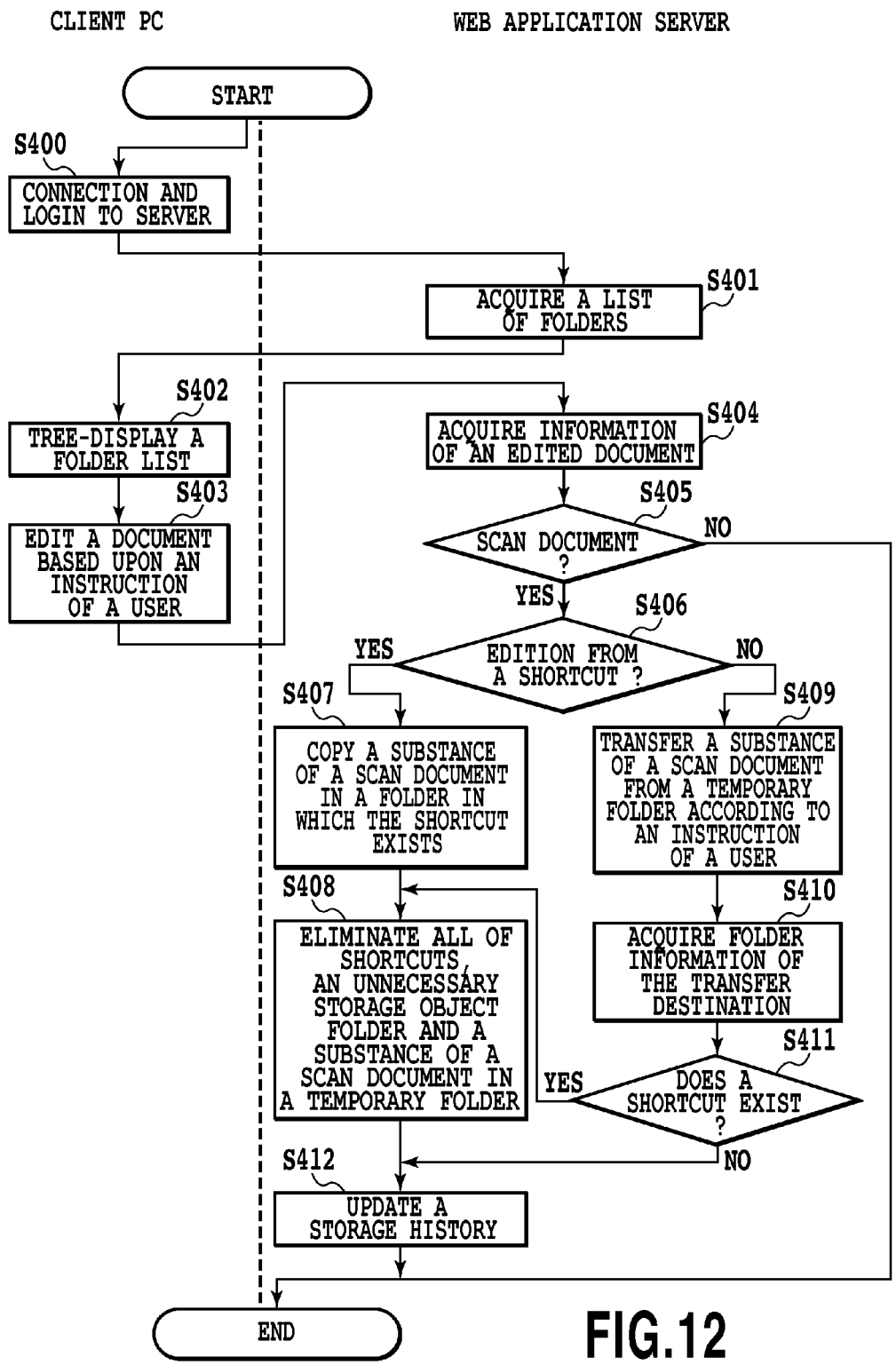
FIG. 12 is a flow chart showing the processing of arranging shortcuts or the like of the scan documents in the document management system according to the second embodiment of the present invention.

FIG. 11 is a conceptual diagram showing a state of arranging the shortcuts or the like of the scan documents in the present document management system according to the second embodiment, and FIG. 12 is a flow chart showing the processing of arranging the shortcuts or the like of the scan documents. Step 400 to step 412 in FIG. 12 correspond to step 200 to step 212 of flow chart (FIG. 8) of the arrangement processing in the first embodiment, a step of which is different in the content is step 408. Accordingly, the steps in common are omitted in the explanation and step 408 which is different in the content will be mainly explained.

When the substance of the scan document is copied in the folder in which the shortcut which a user uses for performing an operation such as editing exists (step 407), the process goes to step 408. In the present embodiment, on the assumption that the scan document A is edited by using the shortcut in the new folder 1, the substance of the scan document A in the temporary folder is copied in the new folder 1 (refer to FIG. 11).

At step 408 the Web application server 20 eliminates all the shortcuts and the substance of the scan document stored in the temporary folder similarly to step 208 in the first embodiment. Here, in a case where at step 307 of the previous storage processing, the new folder for storing the shortcut is produced, the shortcut is eliminated for each new folder which is not accessed upon editing. In the present embodiment, since the shortcut of the new folder 2 is not used, the new folder 2 is eliminated together with the shortcut therein.

Thereafter, at step 412, the update processing of the storage history is executed similarly to step 212. However, in the update at step 412, not the number of storage times, but the scan date and time of the scan document stored in the temporary folder are added together with information of the storage destination folder.

According to the second embodiment, since the storage destination suitable for a user is determined from the storage destination pattern based upon the scan date and time of the past scan document, the scan document can be automatically stored in the storage destination matching with tendency of each user.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the preset invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-98102, filed Apr. 14, 2009, which is hereby incorporated by reference herein in its entirety.

What is claimed is:

1. A document management system in which a client apparatus, a server apparatus and a scanner apparatus are connected through a network, wherein the server apparatus comprises:
a processor and a memory, wherein the processor functions as:
a receiving unit configured to receive a scan document scanned by the scanner apparatus;
a storing unit configured to store the received scan document in a temporary folder;
a determining unit configured to determine, based on a storage history, a plurality of specific folders for each of which storage times of other scan documents exceed a threshold value, wherein the storage history includes information of folders which have stored other scan documents scanned in the past; and
a shortcut producing unit configured to produce a shortcut of the scan document stored in the temporary folder by the storing unit in all of the plurality of specific folders determined by the determining unit.

2. A document management system according to claim 1, wherein the server apparatus further comprises:
a copy producing unit configured to, when the client apparatus accesses the scan document stored in the temporary folder by using one of the shortcuts produced in the plurality of specific folders based on a user's instruction, produce a copy of the accessed scan document in the specific folder in which the used shortcut exists; and
an eliminating unit configured to eliminate the shortcut which is not used and the scan document stored in the temporary folder after the copy is produced by the copy producing unit.

3. A document management system according to claim 1, wherein the server apparatus further comprises:
a number storing unit configured to store, as the storage history, the number of storage times for each folder which has stored other scan documents scanned in the past for each user, and
wherein the determining unit determines, based upon the number of the storage times for each folder, the plurality of specific folders for each of which the number of the storage times of other scan documents exceed the threshold value.

4. A document management system according to claim 3, wherein the determining unit determines the plurality of specific folders for each of which the number of the storage times exceed the threshold value by comparing the number of the storage times for each folder with the threshold value, and
wherein the server apparatus further comprises a notifying unit configured to notify the user that the received scan document is stored in the temporary folder if the determining unit determines that the folder of which the number of the storage times exceeds the threshold value does not exist.

5. A document management system according to claim 1, wherein the scanner apparatus comprises:
a user interface including a browser function;
a displaying unit configured to display a scan button acquired via the browser function from the server apparatus on a screen of the user interface; and
a transmitting unit configured to scan a document and transmit the scanned document to the server apparatus in a case where the user selects the scan button displayed on the screen of the user interface.

6. A document management system in which a client apparatus, a server apparatus and a scanner apparatus are connected through a network, wherein the server apparatus comprises:
a processor and a memory, wherein the processor functions as:
a unit configured to store, as a storage history, scan date and time and a storage destination of past scan documents for each user;
a receiving unit configured to receive a scan document scanned by the scanner apparatus;
a storing unit configured to store the received scan document in a temporary folder;
a determining unit configured to determine, based on the storage history, a plurality of specific folders by acquiring patterns of the scan data and time in regard to the storage destinations and matching information of the scan date and time of the received scan document with the acquired pattern; and
a shortcut producing unit configured to produce a shortcut of the scan document stored in the temporary folder by the storing unit in all of the plurality of specific folders determined by the determining unit.

7. A document management system according to claim 6, wherein the server apparatus further comprises a notifying unit configured to notify the user that the received scan document is stored in the temporary folder in a case where the pattern in regard to the storage destination cannot be acquired from the scan date and time or in a case where the scan date and time of the received document does not match with the acquired pattern.

8. A method of controlling a document management system in which a client apparatus, a server apparatus and a scanner apparatus are connected through a network, the method comprising the steps of:
in the server apparatus,
receiving a scan document scanned by the scanner apparatus;
storing the received scan document in a temporary folder;
determining, based on a storage history, a plurality of specific folders for each of which storage times of other scan documents exceed a threshold value, wherein the storage history includes information of folders which have stored other scan documents scanned in the past; and
producing a shortcut of the scan document stored in the temporary folder by the storing step in all of the plurality of specific folders determined by the determining step.

9. A method of controlling a document management system in which a client apparatus, a server apparatus and a scanner apparatus are connected through a network, the method comprising the steps of:

in the server apparatus, storing, as a storage history, scan date and time and a storage destination of past scan documents for each user;

receiving a scan document scanned by the scanner apparatus;

storing the received scan document in a temporary folder;

determining, based on a storage history, a plurality of specific folders by acquiring patterns of the scan date and time in regard to the storage destinations and matching information of the scan date and time of the received scan document with the acquired pattern; and producing a shortcut of the scan document stored in the temporary folder in all of the plurality of specific folders determined by the determining step.

10. A non-transitory computer-readable recording medium having computer-executable instructions for performing a method performed in a document management system in which a client apparatus, a server apparatus and a scanner apparatus are connected through a network, the method comprising the steps of:

in the server apparatus, receiving a scan document scanned by the scanner apparatus;

storing the received scan document in a temporary folder;

determining, based on a storage history, a plurality of specific folders for each of which storage times of other scan documents exceed a threshold value, wherein the storage history includes information of folders which have stored other scan documents scanned in the past; and producing a shortcut of the scan document stored in the temporary folder by the storing step in all of the plurality of specific folders determined by the determining step.

11. A non-transitory computer-readable recording medium having computer-executable instructions for performing a method performed in a document management system in which a client apparatus, a server apparatus and a scanner apparatus are connected through a network, the method comprising the steps of:

in the server apparatus, storing, as a storage history, scan date and time and a storage destination of past scan documents for each user;

receiving a scan document scanned by the scanner apparatus;

storing the received scan document in a temporary folder;

determining, based on a storage history, a plurality of specific folders by acquiring patterns of the scan date and time in regard to the storage destinations and matching information of the scan date and time of the received scan document with the acquired pattern; and producing a shortcut of the scan document stored in the temporary folder in all of the plurality of specific folders determined by the determining step.

* * * * *